July 20, 1937.  T. DE PORT  2,087,245
AILERON CONTROL
Filed Jan. 17, 1936
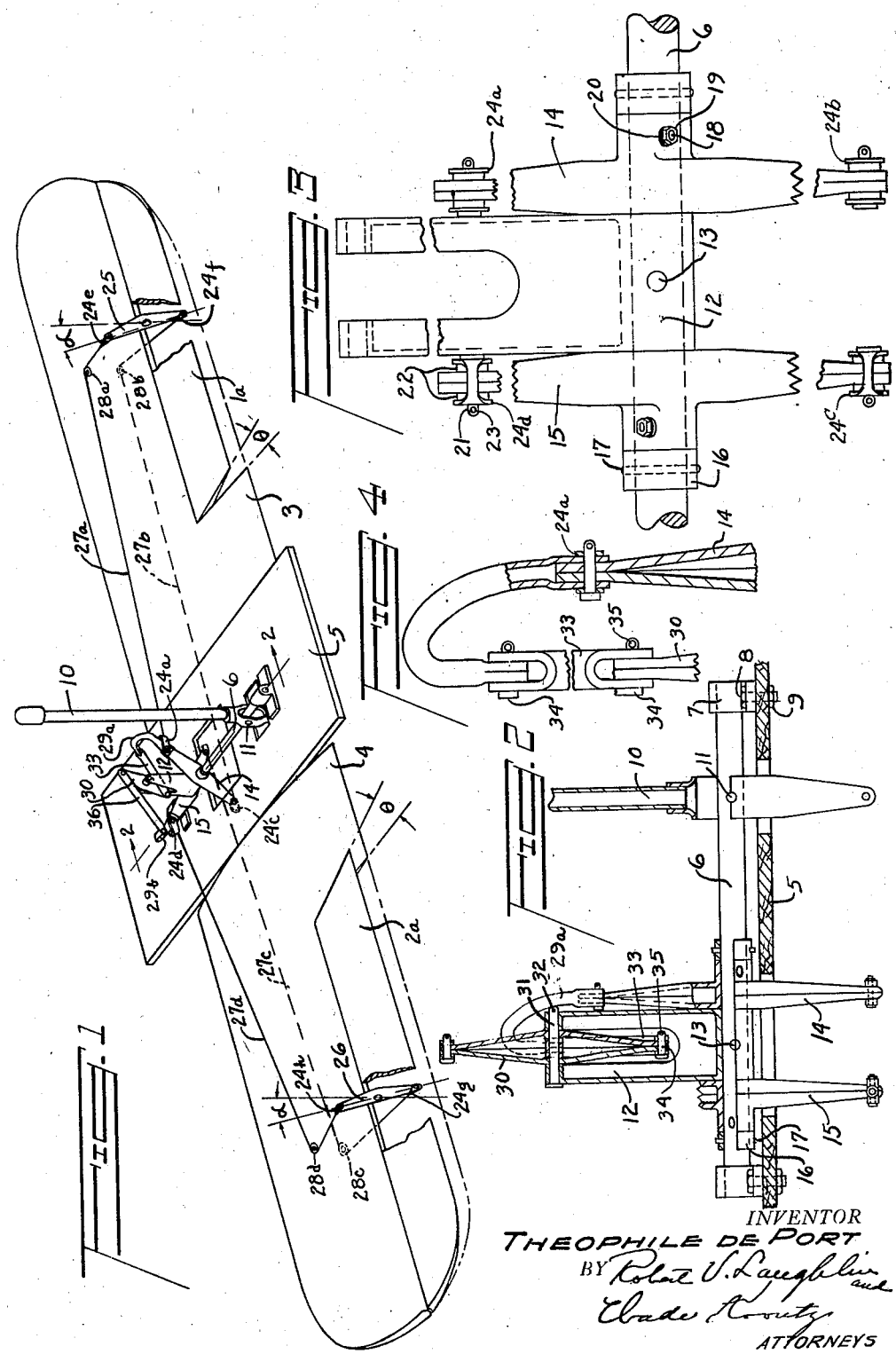
INVENTOR
THEOPHILE DE PORT
BY
ATTORNEYS Patented July 20, 1937

2,087,245

UNITED STATES PATENT OFFICE 2,087,245

AILERON CONTROL

Theophile de Port, New Carlisle, Ohio

Application January 17, 1936, Serial No. 59,541

5 Claims. (Cl. 244—90)

(Granted under the act of March 3, 1883, as amended April 30, 1928; 370 O. G. 757)

The invention described herein may be manufactured and used by or for the Government for governmental purposes, without the payment to me of any royalty thereon.

It is an object of my invention to provide a control which may be readily converted from one furnishing conventional differential angular movement of the ailerons of an aircraft main supporting surface to one permitting "free flapping" of the aforesaid ailerons in combination with retention of the aforementioned differential control.

With the foregoing and other objects in view, which will appear as the description proceeds, the invention consists of certain new and novel features which will be hereinafter more fully illustrated and described in the accompanying drawing and more particularly pointed out in the appended claims.

Referring to the drawing, in which numerals of like character designate similar parts throughout the several claims:

Fig. 1 is a perspective view illustrating my control;

Fig. 2 is an enlarged view, in side elevation, of a detail taken on the line 2—2 of Fig. 1.

Fig. 3 is a still further enlarged view of a portion of Fig. 2;

Fig. 4 similarly shows a further portion of Fig. 2.

Referring to Figs. 1 and 2, ailerons 1a and 2a are hinged to the rear spars of wing panels 3 and 4, forming the main supporting surface of an aircraft. The panels 3 and 4 abut the sides of a fuselage floor 5. A torque tube 6 is longitudinally rotatably secured to the floor 5 by means of brackets 7, bolts 8 and nuts 9. A control stick 10 is laterally rotatably secured to the torque tube 6 by means of a pin 11. A single horned lever 12 is fixed to the tube 6 by means of a pin 13. Double horned levers 14 and 15 are freely rotatably secured to the tube 6, immediately fore and aft of the lever 12, by means of collars 16 and taper pins 17.

When I desire to operate the ailerons 1a and 2a solely through differential angular movement, I employ the part disposition shown in Fig. 3. As viewed from the rear, the levers 14 and 15 are predeterminedly angularly disposed with reference to true vertical, to form an X in end profile. They are fixed to the tube 6 by means of bolts 18, nuts 19 and lock washers 20. The two extremities of the levers 14 and 15 are provided with clevis pins 21, spacer washers 22, cotter pins 23 and clevises 24a, 24b, 24c and 24d. Referring to Fig. 1, it will be noted that ailerons 1a and 2a are provided with double horned masts 25 and 26 and that clevis 24a is connected to a clevis 24e of mast 25, clevis 24b to a clevis 24f (same mast), clevis 24c to a clevis 24g of mast 26 and clevis 24d to a clevis 24h, by means (respectively) of cables 27a, 27b, 27c and 27d passing respectively over pulleys 28a, 28b, 28c and 28d. With the control stick 10 in the position shown in Fig. 1, the "ailerons" will normally assume "positions" 1b and 2b when not differentially disposed. Clockwise movement of the control stick 10, to correct left wing "heaviness", will produce "down" left aileron and "up" right aileron in the conventional manner familiar to all those skilled in the art.

Let it next be assumed that in addition to differential angular movement, I desire to permit the ailerons 1a and 2a to freely "flap" with changing angle of attack of the wing panels 3 and 4, it being only essential that both ailerons remain substantially at the same angle of incidence to their main supporting surface, such as the angle theta of Fig. 1. To effect the foregoing I remove the bolts 18, nuts 19 and lock washers 20 shown in Fig. 3, as well as the spacer washers 22 utilized at clevises 24a and 24d. The latter washers are replaced by the wall thicknesses of horn extensions 29a and 29b, which are telescoped over the upper extremities of levers 14 and 15, as shown in Figs. 2 and 4. A double horned lever 30 is then secured to the upper extremity of the lever 12 by means of a clevis pin 31 and cotter pin 32. With the lever 30 substantially vertical, the bottom thereof is connected to the outer extremity of the extension 29a by means of a link 33, clevis pins 34 and cotter pins 35, while the top thereof is connected to the outer extremity of the extension 29b by means of a link 36, clevis pins 34 and cotter pins 35.

Combined differential and flapping operation is accomplished as follows. Let it be assumed that an aircraft incorporating my control takes off and maintains steady climb. The angle of attack of the wing panels 3 and 4 being of considerable magnitude, pressure upon the under surfaces of the ailerons causes the same to assume positions 1a and 2a; i. e., their angle of attack is theta degrees less than the angle of attack of the wing panels 3 and 4. Upward movement of the trailing edges of the ailerons 1a and 2a causes the upper portions of the masts 25 and 26 to be tilted alpha degrees forward and their lower portions a like number of degrees aft of the mast attitude under aileron positionings 1b and 2b. It is at once apparent that means must be provided for taking up the "slack" occurring in the cable portions between clevises 24e and 24h and pulleys 28a and 28d, with just the reverse occurring in the cable portions between clevises 24f and 24g and pulleys 28b and 28c. This is accomplished by means of horn extensions 29a and 29b (to levers 14 and 15), links 33 and 36, and the lever 30. With the control stick 10 fixed in the neutral position shown in Fig. 1, it is the sole function of the last three-named parts to assure that predetermined clockwise rotation of the lever 15 is simultaneously accompanied by like counter-clockwise rotation of the lever 14 (about the stationary torque shaft 6) such that predetermined increments of "take-up" in cables 27a and 27d is simultaneously accompanied by like increments of "slack" in cables 27b and 27c. How this is accomplished is readily apparent from an inspection of Fig. 1. It is further apparent, from the same figure, that lateral clockwise or counter-clockwise movement of the control stick 10 will induce like movement of the lever 12, thereby effecting normal differential control of the ailerons entirely independent of momentary "free flapping" angle theta.

I claim:

1. In an aircraft having a pair of ailerons and means connecting said ailerons in differential and in equalizing relation comprising, a rotatable shaft, a pair of levers pivotally mounted on said shaft and connected to said ailerons in such a manner that angular deflection of said levers in the same direction or in opposite directions will produce respectively opposite angular deflection or like angular deflection of said ailerons, and means interconnecting said levers and said shaft for causing said levers to move in response to movements of said shaft but being free for relative angular movement about said shaft in response to like angular deflection of said ailerons.

2. In an aircraft having a pair of ailerons and means connecting said ailerons in differential and in equalizing relation comprising, a rotatable shaft, a pair of levers pivotally mounted on said shaft and connected to said ailerons in such a manner that equal angular deflection of said levers in the same direction or in opposite directions will produce respectively equal and opposite angular deflection or like angular deflection of said ailerons, and means interconnecting said levers and said shaft for causing equiangular movement of said levers in response to like movements of said shaft but being free for opposing angular movement about said shaft in response to equiangular deflection of said ailerons.

3. In an aircraft having a pair of ailerons and means connecting said ailerons in differential and in equalizing relation comprising, a rotatable shaft, a lever fixed to said shaft, a pair of levers pivoted to said shaft on opposite sides of said fixed lever and connected to said ailerons in such a manner that equal angular deflection of said levers in the same direction or in opposite directions will produce respectively equal and opposite angular deflection or like angular deflection of said ailerons, and linkage means between said fixed lever and said pivotally mounted levers comprising, a double horned lever pivotally mounted at its mid portion to the outer extremity of said fixed lever, and links connecting said double horned lever to said pair of levers such that said latter levers are confined to equal and opposite movement with respect to said fixed lever.

4. A control adapted for conventional four-cable attachment to the ailerons of an aircraft comprising, a rotatable shaft, a lever fixed to said shaft, a pair of double horned levers pivoted to said shaft on opposite sides of said fixed lever and having their ends operatively connected to said cables, a third double horned lever pivotally mounted at its mid portion to the outer extremity of said fixed lever, horn extensions fixed to the uppermost extremities of said first and second double horned levers, and links operatively connecting the extremities of said third double horned lever to said horn extensions in Z profile form.

5. A control adapted for conventional four-cable attachment to the ailerons of an aircraft comprising, a rotatable shaft, a lever fixed to said shaft, a pair of double horned levers pivoted to said shaft on opposite sides of said fixed lever and having their ends operatively connected to said cables, a third double horned lever pivotally mounted at its mid portion to the outer extremity of said fixed lever, horn extensions fixed to the uppermost extremities of said first and second double horned levers, a link operatively connecting one extremity of said third double horned lever to the end of one of said horn extensions, and a second link operatively connecting the remaining extremity of said third double horned lever to the end of said remaining horn extension.

THEOPHILE DE PORT.